United States Patent [19]

Castro et al.

[11] Patent Number: 5,116,689

[45] Date of Patent: May 26, 1992

[54] APPARATUS AND METHOD FOR SELECTIVELY INCREASING DENSITY AND THERMAL CONDUCTIVITY OF HONEYCOMB STRUCTURES

[75] Inventors: Robert M. Castro, La Mesa; James M. Adee, San Diego, both of Calif.

[73] Assignee: Rohr Industries, Inc., Chula Vista, Calif.

[21] Appl. No.: 509,932

[22] Filed: Apr. 16, 1990

Related U.S. Application Data

[63] Continuation-in-part of Ser. No. 267,930, Nov. 7, 1988, abandoned.

[51] Int. Cl.$^5$ .............................. B32B 3/12
[52] U.S. Cl. ........................... 428/593; 52/806; 156/292; 428/117
[58] Field of Search ............. 428/116, 117, 118, 73, 428/593; 52/806; 156/197, 292

[56] References Cited

U.S. PATENT DOCUMENTS

| | | |
|---|---|---|
| 2,633,439 | 3/1953 | Konstandt ........................ 428/116 |
| 3,428,515 | 2/1969 | Lorentzen ........................ 428/117 |
| 3,922,058 | 11/1975 | Kinnear .......................... 439/811 |
| 4,076,877 | 2/1978 | Tanzen ...................... 428/117 X |
| 4,304,376 | 12/1981 | Hilton ....................... 428/116 X |
| 4,388,277 | 6/1983 | Wright ............................ 422/211 |
| 4,447,816 | 5/1984 | Kurina et al. ................. 52/108 X |
| 4,643,933 | 2/1987 | Picken ............................ 428/116 |
| 4,716,067 | 12/1987 | Moji et al. ...................... 428/117 |

FOREIGN PATENT DOCUMENTS

| | | | |
|---|---|---|---|
| 680648 | 2/1964 | Canada ........................... 428/117 |
| 1175861 | 8/1964 | Fed. Rep. of Germany ...... 428/116 |
| 794217 | 4/1958 | United Kingdom ............... 428/118 |
| 2197618 | 5/1988 | United Kingdom ............... 428/116 |

*Primary Examiner*—Henry F. Epstein
*Attorney, Agent, or Firm*—P. J. Schlesinger; F. D. Gilliam

[57] ABSTRACT

A locally reinforced honeycomb core panel having a honeycomb core, at least one coiled insert in at least one honeycomb cell and at least one face sheet. These components are formed from high temperature resistant metals. Elongated foil strips are coiled into cylindrical shapes having diameters slightly less than the width of individual cells in the honeycomb panel and heights no greater than the depth of the cells. These coiled inserts are placed in individual cells in selected portions of the honeycomb core to locally improve density, strength and thermal transfer characteristics of the panel. The coiled inserts have sufficient resiliency so that when they are inserted into cells and allowed to unwind, they press tightly against the cell inside wall even if the cell shape has been distorted in handling. The cells are held in place by the face sheet(s) bonded to the honeycomb core. If desired, the coils may be bonded to the cell walls by diffusion bonding or brazing.

16 Claims, 2 Drawing Sheets

APPARATUS AND METHOD FOR SELECTIVELY INCREASING DENSITY AND THERMAL CONDUCTIVITY OF HONEYCOMB STRUCTURES

CROSS REFERENCE TO RELATED APPLICATIONS

This application is a continuation-in-part of copending U.S. patent application Ser. No. 267,930, filed Nov. 7, 1988.

BACKGROUND OF THE INVENTION

This invention is directed to improving the performance of high temperature resistant metal honeycomb core structural panels by localized densification of the panel.

Strong, lightweight structural boards have long been made for use in doors, walls, and the like. Generally, such boards consist of two impervious sheets or skins with a lightweight material bonded between the boards. Typical of these are the doors described by Konstandt in U.S. Pat. No. 2,633,439 where spiraled wood shavings are packed between plaster or resin sheets and the assembly is bonded together. A similar panel is described in German patent 1175861, where small coiled members are coated with adhesive and packed between face sheets to form a light weight door. While suitable for some applications, these panels have relatively low strength, not incorporating the more efficient honeycomb core structure and are not resistant to high temperatures.

Lightweight, high strength, panels made up of a metal honeycomb core with one or two metal face sheets bonded thereto have come into widespread use in aircraft, space vehicles and the like. For many purposes, high temperature resistant panels with the components bonded by brazing, diffusion bonding or the like, are necessary. Many presently known panels do not have the required high temperature resistance. Also, while some panels have great strength across a broad panel, difficulties are encountered when it becomes necessary to fasten other structures to the panels or where locally higher forces are directed against the panel. Often it is necessary to bond external structures to areas of the honeycomb panel. Such attachments tend to apply localized pressure, loads and stress to the panels. Without reinforcement the panels are subject to crushing when highly localized stress is applied.

In the manufacture of panels having honeycomb or circular cell cores, a coiled strip is sometimes placed in each desired cell as a manufacturing aid. As described by Lorentzen in Canadian Patent 680,648, a foil coil maybe placed in each honeycomb cell during bonding of cell interfaces together, so as to prevent bonding in regions intended to form the open cell. These coils are placed in every cell, so that localized reinforcement is not possible. While the cells do increase strength slightly across the panel, in areas that do not require reinforcement they merely add unnecessary and usually undesirable weight. Further, this manufacturing technique is useful only with adhesively bonded honeycomb structures which do not have the often required high temperature resistance.

Somewhat similarly, Evans et al in British Patent 2,197,618 describe placing scrolled paper tubes in circular cells forming the core of a panel. The tubes are placed in all cells, not in localized areas. The tubes are intended to support the tubes during bonding of resin impregnated fiber cell walls. With carbon-carbon composites, the paper tubes are charred and later removed, so that no permanent reinforcement is provided.

Also, while the thermal insulating properties of honeycomb panels are highly desirable in many applications, in some cases it is beneficial to improve heat transfer in local area from a heat source on one side of the panel to heat sink or the like on the other side of the panel. Most honeycomb panels have only thin webs spanning the distance between face sheets, providing very limited heat transfer.

In the past, attempts have been made to improve the local strength and thermal transfer characteristics of honeycomb panels by cutting holes in the panel face sheet and injecting a synthetic resin potting compound or inserting a resin insert to fill selected cells or groups of cells, as described in German patent 2425014. A fastener or the like may be embedded in the potting compound, as described by Moji et al in U.S. Pat. No. 4,716,067. While effective for some purposes, this method is not adaptable to all fasteners, requires considerable hand-work and care to properly fill the cells and does not improve thermal conductivity, since most potting materials have low thermal conductivity these materials seriously deteriorate at the high temperatures required in many aerospace applications.

As shown in British Patent 794,217, honeycomb cells may be reinforced by inserting adhesive coated tubes into selected cells. The tubes seem to be a loose fit with an exterior coating of adhesive filling the gap between tube and interior cell wall. Uniform pressure contact between tube and cell wall does not seem possible, since inserting a tight-fitting tube could easily damage the thin cell walls. Even if cells and tube are formed from a suitable metal, the use of adhesive bonding would preclude use at high temperatures. Also, if the cell shape is distorted in handling, as often happens, the tubes will not fit well.

In other cases, a region of the honeycomb core is removed, prior to application of the face sheets, and a solid metal insert is placed in the cutout. The insert is typically bonded to the face sheets when those sheets are bonded to the core. While these solid inserts are effective with a great many fasteners and have excellent thermal conductivity, they tend to be heavy and add an undesirably amount of weight, which can be of critical importance in aircraft and space vehicle applications. In many cases only small improvements in strength of the local panel area is necessary so that the greater improvement provided by solid inserts is not necessary.

Therefor there is a continuing need for improved honeycomb core panels with selectively located inserts which can increase the density, strength and thermal conductivity to a variable selected extent in local areas without excessively increasing the weight or complexity of the assembly or compromising the ability to use the panel at high temperatures.

SUMMARY OF THE INVENTION

This invention involves high strength, high temperature resistant, lightweight metal honeycomb panels including a metal honeycomb core, at least one metal face sheet and at least one coil insert in at least one cell. The assembly is bonded together by a method such as diffusion bonding or brazing which permits the assembly to be used at high temperatures without compromising structural integrity. For best results at elevated temperatures, the components should be fabricated from titanium, high temperature titanium alloys, nickel aluminides, one of the nickel based Super Alloys, or a combination thereof. These metals should have melting temperatures of approximately that of titanium, or higher. While hexagonal honeycomb core is preferred, a core having a triangular, square or other cell shape could be used, if desired. For clarity, "honeycomb" will be used in a generic sense.

Basically, each insert comprises an elongated, resilient, metal foil strip which has been coiled into a cylindrical configuration, with the diameter of the cylinder slightly less than the diameter of each hexagonal cell and the height of the cylinder no greater than the height of the cells.

The length of the strip (and thus the number of foil layers in the cylinder wall), the thickness of the strip and the metallic composition of the strip may be selected to give the desired degree of strength, density and thermal conductivity desired. Preferably, the strip will only slightly overlap, (up to about 25% of the circumference of the coil) although greater overlap to the point where there are several layers may be used if desired. Generally, the foil will have a thickness of from about 0.001 to 0.005 inch.

The coils are very simple to produce, typically being coiled with the fingers to a diameter less than the honeycomb cell diameter, after which they are manually slipped into the selected cells and allowed to unwind sufficiently to come into tight, slight pressure, contact with the interior cell walls. Precoiled inserts could, of course, be inserted manually or mechanically, such as by a robotic insert device. When the face sheets are bonded to the honeycomb core, the inserts are held in place. In some cases it is preferable to bond the inserts to the cell wall by brazing, diffusion bonding or similar high temperature resistant technique, as detailed below. The inserts both increase the strength of the panel in the reinforced regions, but also improve the transverse thermal conductivity of the panel in those regions.

BRIEF DESCRIPTION OF THE DRAWINGS

The advantages and features of this invention will become better appreciated and understood by reference to the following detailed description when taken together with the accompanying drawing, wherein.

DESCRIPTION OF PREFERRED EMBODIMENTS

Figures 1, 2:
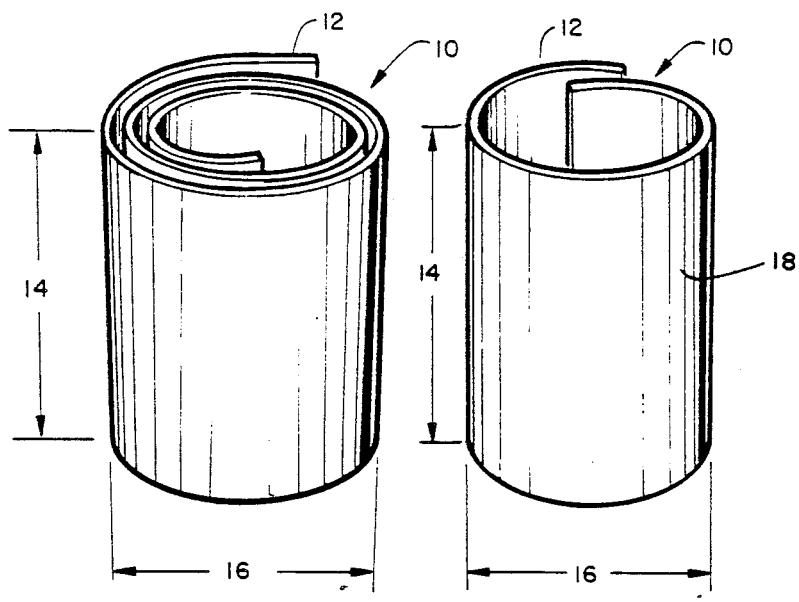
FIG. 1 is a perspective view of one of the insert coils of this invention.
FIG. 2 is a perspective view of a second embodiment of one of the insert coils of this invention.

As seen in FIG. 1, insert 10 is formed from a coiled foil strip 12. For clarity, the coil is shown fairly loosely wound. In the embodiment of FIG. 1, the foil 12 is wound sufficiently to provide at least two layers of foil 12 around the entire circumference of insert 10. Since the coil metal has considerable resilience, it will tend to unwind if released. This arrangement provides higher density and higher strength than a single layer coil.

FIG. 2 illustrates an embodiment in which foil 10 only slightly overlaps at the edges, less than one diameter of insert 10. This is a simple, easily inserted coil which easily expands into intimate contact with cell walls after insertion without adding excessive weight to the panel. In most cases, this is the optimum embodiment.

The height 14 of the coiled insert is no greater than the height of the hexagonal cells into which the coil is to be inserted. In fact, for optimum results the height 14 precisely matches the height of the cell with which it is to be used. Taller inserts will prevent smooth contact of face sheets over the entire honeycomb core surface, while much shorter cells may not resist panel crushing forces until the panel is crushed sufficiently to bring the face sheet into contact with the insert. Slightly shorter coils may be used if the bonding media (e.g., braze or adhesive) forms sufficient fillet to fill any coil sheet gap and transfer thermal and/or mechanical stresses between face sheet and insert. It is often advantageous to form the coils from the same metal strip material as is used to make the honeycomb core to assure uniform height The outside diameter 16 of insert 10 should be typically slightly less than the inside diameter of the cells with which it is to be used. During coil insert insertion, it is preferred to wind the coil to a diameter slightly less than the cell diameter and to allow the insert to unwind slightly after insertion during bonding at the face sheets to the honeycomb.

Figure 3:
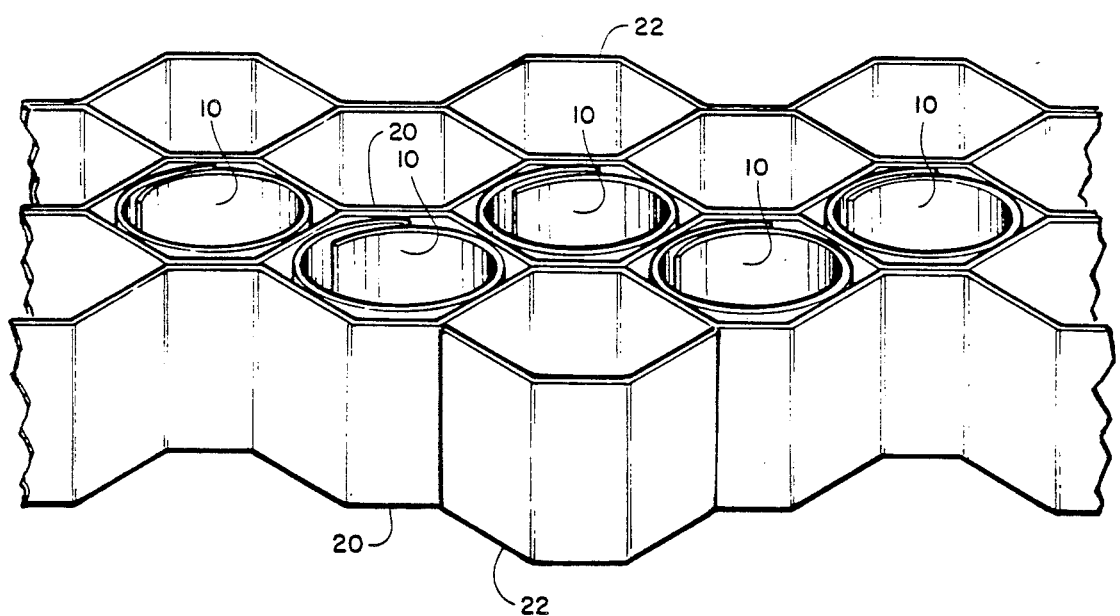
FIG. 3 is a perspective view of a portion of a honeycomb core with the inserts in place at selected locations.
Figure 4:
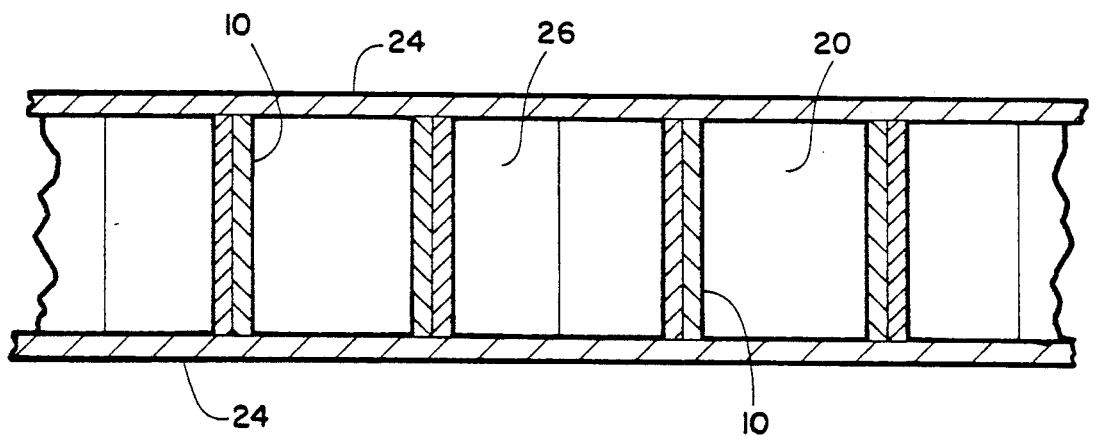
FIG. 4 is a vertical section view through a complete honeycomb panel with inserts in place.

Installation of coils 10 in a honeycomb structure 22 is illustrated in FIGS. 3 and 4. Inserts 10 are coiled to a smaller diameter than the cell diameter, inserted in the selected cells 20 as seen in FIG. 3 and allowed to unwind sufficiently to bring the outer surface layer 18 of insert 10 into close, slight pressure, contact with the cell interior walls. If the cell shapes have been distorted during handling the coils will still be insertable and will unwind to press against cell walls. Then face sheets 24 as seen in FIG. 4 are brought into contact with both faces of honeycomb panel 22, including filled cells 20 and empty cells 26 with a thin layer of the similar brazing material between face sheets and cell edges. The assembly may then be heated to the eutectic temperature in an inert atmosphere for a time sufficient to produce liquid interface diffusion bonding between face sheets and cell edges.

During the brazing operation, the coils can simultaneously be brazed together and to the cell walls. Where brazing is desired, foil 12 may have a very thin (typically 0.002 inch) layer of a brazing material such as copper, nickel or a combination thereof.

If desired, one face sheet 24 may be bonded to one side of honeycomb core 22 before the coils are inserted into selected cells. Other suitable methods which provide a high temperature resistant final structure, such as diffusion bonding, may be used to bond the assembly together. In any case, the result is a strong, unitary assembly having added strength in those local regions where inserts 10 have been placed.

For optimum performance each component is formed from a high temperature resistant metal and are bonded together in a manner retaining these high temperature resistant characteristics. Ideally, the metal components are made from the high temperature resistant metals listed above.

While certain specific materials, arrangements and dimensions have been detailed in the above description of preferred embodiments, those may be varied with similar results.

We claim:

1. A locally reinforced, high temperature resistant, high strength, low weight structural panel having improved transverse thermal conductivity in reinforced areas, which comprises:
   a honeycomb core having a plurality of parallel cells and consisting of shaped high temperature resistant metal foil strips;
   at least one high temperature resistant thin metal face sheet bonded to at least one face of said core; and
   a plurality of generally cylindrical thin resilient coils of high temperature resistant metal foil positioned in a selected plurality of cells in said core, said resiliency causing intimate contact between coils and cell interior walls.

2. The panel according to claim 1 wherein face sheets are bonded to both faces of said core through a layer of brazing metal or a diffusion bond.

3. The panel according to claim 2 wherein said coils are bonded to said cells by brazing materials which wicks down between coils and cell walls.

4. The panel according to claim 1 wherein said coils when in said cells overlap no more than about 25% of their circumference.

5. The panel according to claim 1 wherein said coils when in said cells overlap at least one full turn.

6. The panels according to claim 1 wherein said coils and said honeycomb core are made from foil strips having the same width to assure uniform height of core and coils.

7. The panels according to claim 1 wherein said coils, core and face sheets are manufactured from metals selected from the group consisting of titanium, high temperature titanium alloys, nickel aluminides and the nickel based Super Alloys, all having melting temperatures substantially equal to or exceeding that of titanium.

8. The method of manufacturing a locally reinforced, high strength, low weight, high temperature resistant structural panel having improved transverse thermal conductivity, which comprises the steps of:
   providing a high temperature resistant metal honeycomb core having a plurality of parallel cells with interior walls;
   bonding a face sheet of high temperature resistant metal to one surface of said core;
   winding strips of resilient, high temperature resistant metal foil having a width no greater than the thickness of said core into coils having outside diameters less than the width of said cells;
   allowing said coils to partially uncoil thereby causing intimate contact with said interior walls; and
   bonding a second face sheet to the second surface of said core.

9. The method according to claim 8 wherein said coils are wound and inserted into said cells prior to bonding said first face sheet to said core.

10. The method according to claim 8 wherein said coils are bonded to said core by a bonding method which retains the high temperature resistance of the components.

11. The method according to claim 10 wherein said face sheets are bonded to said core by brazing or diffusion bonding.

12. The method according to claim 11 wherein said coils are bonded to said cell walls and to said face sheets simultaneously with bonding said face sheets to said core.

13. The method according to claim 8 wherein said coils are wound to form a coil having an overlap of no greater than about 25% of the coil circumference.

14. The method according to claim 8 wherein said coils are wound to form a coil having an overlap of at least one full turn.

15. The method according to claim 8 wherein said honeycomb and said coils are formed from metal strips having the same diameter to assure identity between the height of said coils and thickness of said core.

16. The method according to claim 8 wherein said honeycomb, core and coils are fabricated from a metal selected from the group consisting of titanium, high temperature titanium alloys, nickel aluminides and the nickel based Super Alloys, all having melting temperatures substantially equal to or exceeding that of titanium.

* * * * *